United States Patent
Roadley-Battin et al.

(10) Patent No.: US 12,480,420 B2
(45) Date of Patent: Nov. 25, 2025

(54) ELECTRIC POWER ARRANGEMENT FOR PROPULSION

(71) Applicant: Hamilton Sundstrand Corporation, Charlotte, NC (US)

(72) Inventors: Jonathan Mark Roadley-Battin, Birmingham (GB); Mital Shah, Harrow (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 19/016,574

(22) Filed: Jan. 10, 2025

(65) Prior Publication Data
US 2025/0243776 A1    Jul. 31, 2025

(30) Foreign Application Priority Data
Jan. 31, 2024 (EP) .................................. 24275003

(51) Int. Cl.
*F01D 15/10*     (2006.01)
*B64D 27/33*     (2024.01)
(Continued)

(52) U.S. Cl.
CPC ............ *F01D 15/10* (2013.01); *B64D 27/33* (2024.01); *F02C 6/00* (2013.01); *F02C 7/00* (2013.01); *B64D 31/16* (2024.01); *B64D 35/022* (2024.01)

(58) Field of Classification Search
CPC ... F01D 15/10; F02C 6/00; F02C 7/00; B64D 27/02; B64D 27/30; B64D 27/33;
(Continued)

(56) References Cited

U.S. PATENT DOCUMENTS

| 5,097,184 A | 3/1992 | Echtler et al. |
| 11,065,979 B1 * | 7/2021 | Demont ................. H02P 5/00 |

(Continued)

FOREIGN PATENT DOCUMENTS

| DE | 102020114701 A1 | 12/2021 |
| EP | 3699090 A1 | 8/2020 |
| EP | 3944456 A1 | 1/2022 |

OTHER PUBLICATIONS

European Search Report for Application No. 24275003.2, mailed Jul. 5, 2024, 7 pages.

*Primary Examiner* — William H Rodriguez
(74) *Attorney, Agent, or Firm* — CANTOR COLBURN LLP

(57) ABSTRACT

An electric motor drive system for a propulsion device. The system includes a battery stack having an earth terminal and an end terminal and an electric motor electrically connected to be powered by the battery stack. The motor is configured to be connected to drive the propulsion device, The system also includes: a power converter electrically connected between the battery stack and the electric motor; and a switch between the power converter and the battery stack. The switch is arranged to switch between a first state electrically connecting the end terminal of the battery stack to the power converter to provide a maximum battery voltage to the power converter, and a second state electrically connecting a tap point from one or more intermediate nodes, intermediate the earth terminal and the end terminal, of the battery stack, to provide a voltage less than the maximum battery voltage to the power converter.

16 Claims, 4 Drawing Sheets

(51) Int. Cl.
*F02C 6/00* (2006.01)
*F02C 7/00* (2006.01)
*B64D 31/16* (2024.01)
*B64D 35/022* (2024.01)

(58) Field of Classification Search
CPC ........ B64D 31/16; B64D 31/18; B64D 35/02; B64D 35/021; B64D 35/022; H01M 2220/20; H01M 10/425
See application file for complete search history.

(56) References Cited

U.S. PATENT DOCUMENTS

| | | | |
|---|---|---|---|
| 11,084,397 B2 | 8/2021 | Erhart | |
| 2012/0209456 A1 | 8/2012 | Harmon et al. | |
| 2020/0274203 A1* | 8/2020 | Kirleis | B60L 58/19 |
| 2020/0274368 A1* | 8/2020 | Crouse, Jr. | B64U 50/19 |
| 2020/0274371 A1* | 8/2020 | Kirleis | B64D 27/24 |
| 2022/0306305 A1* | 9/2022 | Cottrell | B64D 27/34 |
| 2024/0025297 A1* | 1/2024 | Demont | H02P 29/028 |
| 2024/0270406 A1* | 8/2024 | Pezeshkfar | B64D 27/34 |
| 2024/0417079 A1* | 12/2024 | Durocher | B64D 13/06 |
| 2025/0015734 A1* | 1/2025 | Roadley-Battin | H02P 3/025 |
| 2025/0027425 A1* | 1/2025 | Philbrick | B64D 31/18 |
| 2025/0101909 A1* | 3/2025 | Freer | F01D 15/10 |
| 2025/0118818 A1* | 4/2025 | Lambourne | B60L 58/21 |

* cited by examiner

ELECTRIC POWER ARRANGEMENT FOR PROPULSION

CROSS-REFERENCE TO RELATED APPLICATIONS

This application claims the benefit of European Patent Application No. 24275003.2 filed Jan. 31, 2024, the disclosure of which is incorporated herein by reference in its entirety.

TECHNICAL FIELD

This disclosure is concerned with providing an electric power supply for use in electric propulsion over a wide speed range.

BACKGROUND

Aircraft are driven by propulsion devices which are caused to rotate at different speeds for different stages of flight of the aircraft by a drive system. Conventionally, propulsion devices have been driven by internal combustion engines. Other moving parts of aircraft and other aircraft systems such as environmental control systems have also been conventionally controlled using mechanical or hydraulic systems. Such systems are typically robust and reliable, which is of primary importance in aircraft, but they use large amounts of fuel and are heavy and bulky. As the environmental impact of the noise and emissions caused by internal combustion engines and other aircraft systems is becoming of increasing concern, there is a move towards so-called more electric aircraft (MEA) or even all electric aircraft (AEE).

Whilst electric solutions are now being found for many aircraft systems, it has not yet been possible to completely replace the drive systems for the propulsions devices with solely electric motors, as the amount of energy required for reliable propulsion would require unfeasibly large batteries.

Hybrid propulsion systems have been developed that combine, either in series or in parallel, internal combustion engine drive and electric motor drive systems. Such hybrid arrangements are known and will not be described here in further detail. Research is ongoing to find a fully-electric drive for a propulsion device.

Regardless of whether an electric motor is used alone or together with an internal combustion engine, there is a challenge in designing an electric drive system that is suitable for different stages of flight. On-ground operations such as electric engine start and electric taxiing of the aircraft typically require a low-speed but high torque electric machine. On the other hand, during flight, a higher speed, higher power electric machine is needed. Possible solutions to this dilemma are to use parallel inverters, but this will require a much larger LRU for the drive system, or to increase the coolant requirements, which, again, increases the size, weight, cost and complexity of the drive system.

There is a need for an electrical drive for a propulsion device that can simply and reliably meet the propulsion needs at different stages of aircraft flight or operation requiring different speeds.

SUMMARY

According to the disclosure, there is provided an electric motor drive system for a propulsion device, the system comprising: a battery stack having an earth terminal and an end terminal; an electric motor electrically connected to be powered by the battery stack, the motor configured to, in use, be connected to drive the propulsion device; a power converter electrically connected between the battery stack and the electric motor; and a switch between the power converter and the battery stack, the switch arranged to switch between a first state electrically connecting the end terminal of the battery stack to the power converter to provide a maximum battery voltage to the power converter, and a second state electrically connecting a tap point from one or more intermediate nodes, intermediate the earth terminal and the end terminal, of the battery stack, to provide a voltage less than the maximum battery voltage to the power converter.

The switch may be a single pole double throw, SPDT, contactor.

The power converter may comprises an inverter having a plurality of inverter switches.

The battery stack may comprise a plurality of stack layers, with the tap point in the middle of the plurality of layers, although other positions for the one or more tap points are possible.

A battery management module may control operation of the switch.

Also provided is a propulsion system comprising a propulsion device and an electric motor drive system as defined above connected to drive the propulsion device.

The propulsion system may be a series or parallel hybrid propulsion system comprising an internal combustion engine drive system and an electric motor drive system.

The propulsion device may be an aircraft propeller.

BRIEF DESCRIPTION OF THE FIGURES

Examples of the solution provided by this disclosure are described below with reference to the drawings. It should be noted that these are examples only and that variations are possible within the scope of the claims.

DETAILED DESCRIPTION

Figure 1:
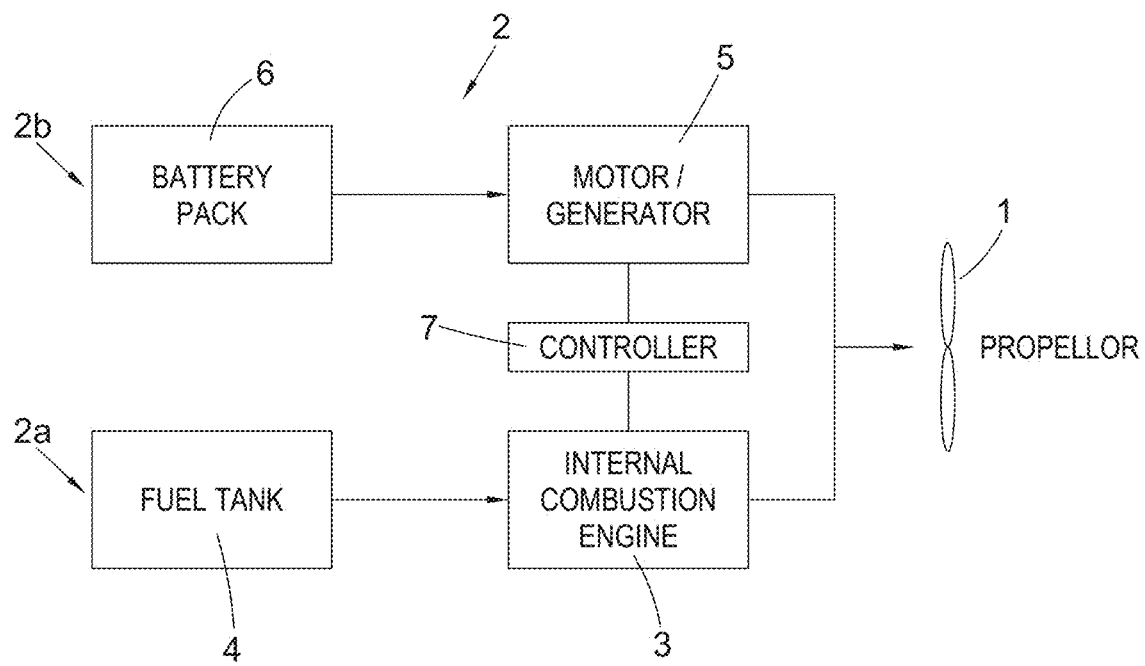
FIG. 1 is a schematic view of a hybrid propulsion system

As mentioned above, in a move towards reducing size, weight, noise and emissions, hybrid propulsion systems have been developed e.g. as shown simply and schematically in FIG. 1. The propulsion device, here propeller 1 is caused to rotate by a hybrid drive system 2. The hybrid drive system 2 includes an engine drive system 2*a* and an electric motor drive system 2*b*. The engine drive system includes an internal combustion engine 3 that is connected to and powered from a fuel tank 4. The electric motor drive system 2*b* includes an electric motor or generator 5 that is connected to and powered by a battery pack 6. A controller 7 switches between the two drive systems according to the requirements and design/capability of the system, to drive the propeller 1.

The present disclosure is only concerned with the electric motor drive system of a hybrid drive system (which may be any type of hybrid drive system), or, for future developments, an electric motor drive system that may be the sole drive system of a propulsion system or combined with some other type of drive system.

The challenge of designing an electrical drive system for propulsion will be explained with reference to FIGS. 2 to 5.

Figure 2:
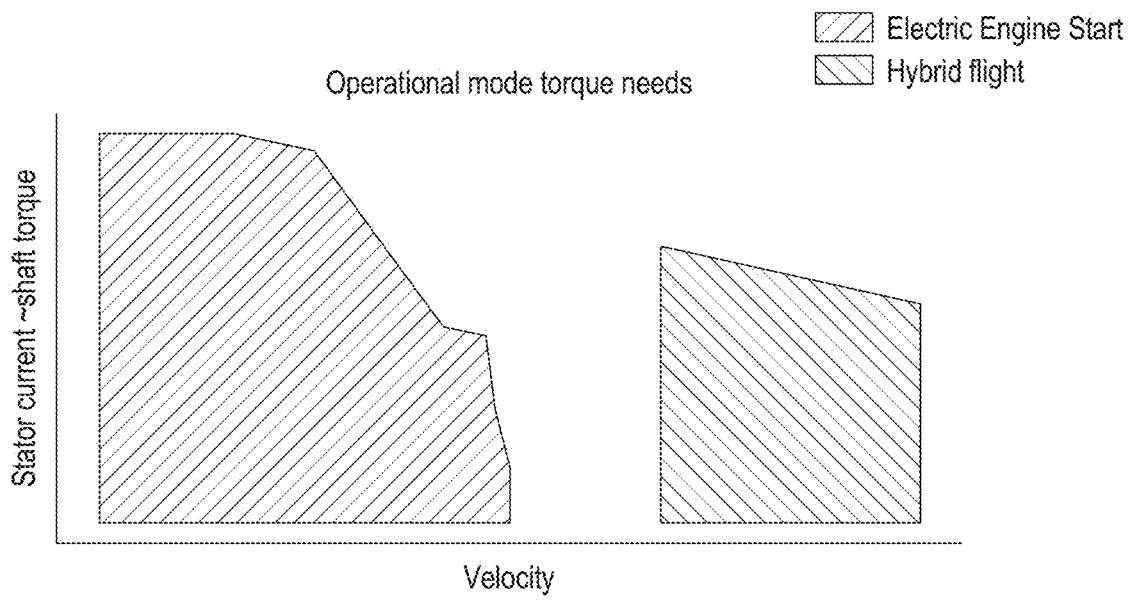
FIG. 2 shows typical current/torque needs across different propulsion speeds.

As can be seen from FIG. 2, at zero and low velocities e.g. an on-ground start-up or taxiing (represented by area A in FIG. 2) the electric motor stator/drive shaft torque is high. At higher velocities, e.g. during flight (represented by area B) the current/torque drops.

Figure 3:
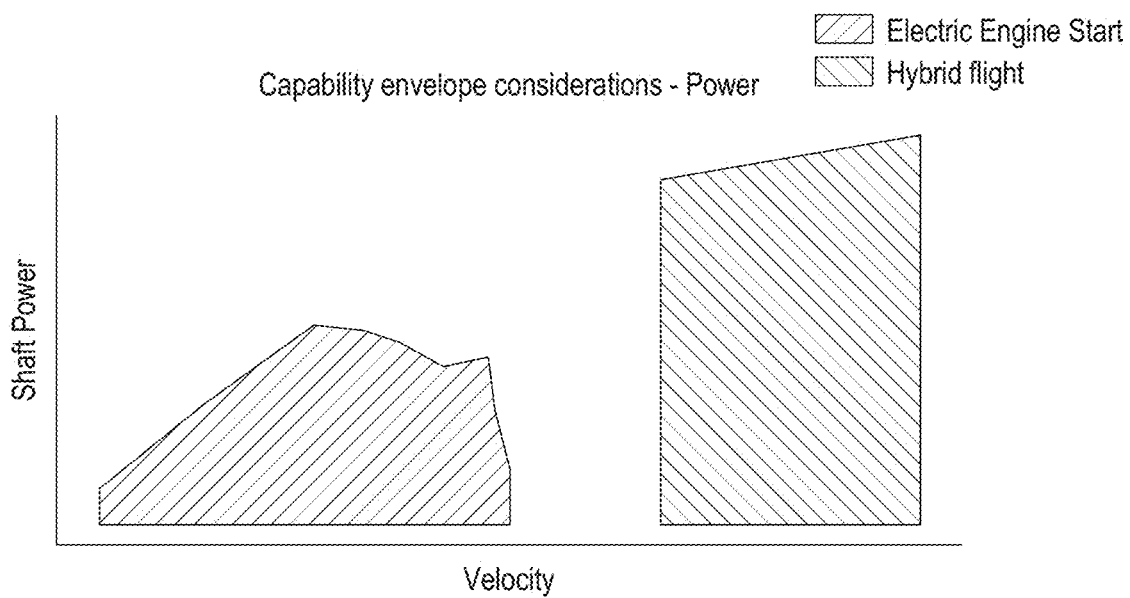
FIG. 3 shows typical power needs across different propulsion speeds.

In contrast, however, as seen in FIG. 3, in the lower velocity range (A) the power is relatively low compared to the power in the higher velocity range (B).

The electric drive system needs to be designed to meet these conflicting needs.

It is advantageous to operate the power conversion at higher voltage to improve power density and power conversion to meet the higher power operating needs. This influences the design of the electric motor resulting in a back EMF constant, Ke, that is low enough to achieve the higher velocities, but the lower torque constant, Kt, means that higher current is required to achieve the high torque that is required for the low velocity, start-up/taxiing, needs.

As a result, the system has a higher working voltage to provide the high power needed for the higher velocity phase, but a higher current for the low velocity requirements, which requires a larger volume and mass in the inverter required for the higher current conversion capability. Busbars and cabling can be sized for the higher currents, but the junction temperature of the power devices in the inverter is a main limiting factor. The junction temperature is dependent on coolant and loss.

Figure 4:
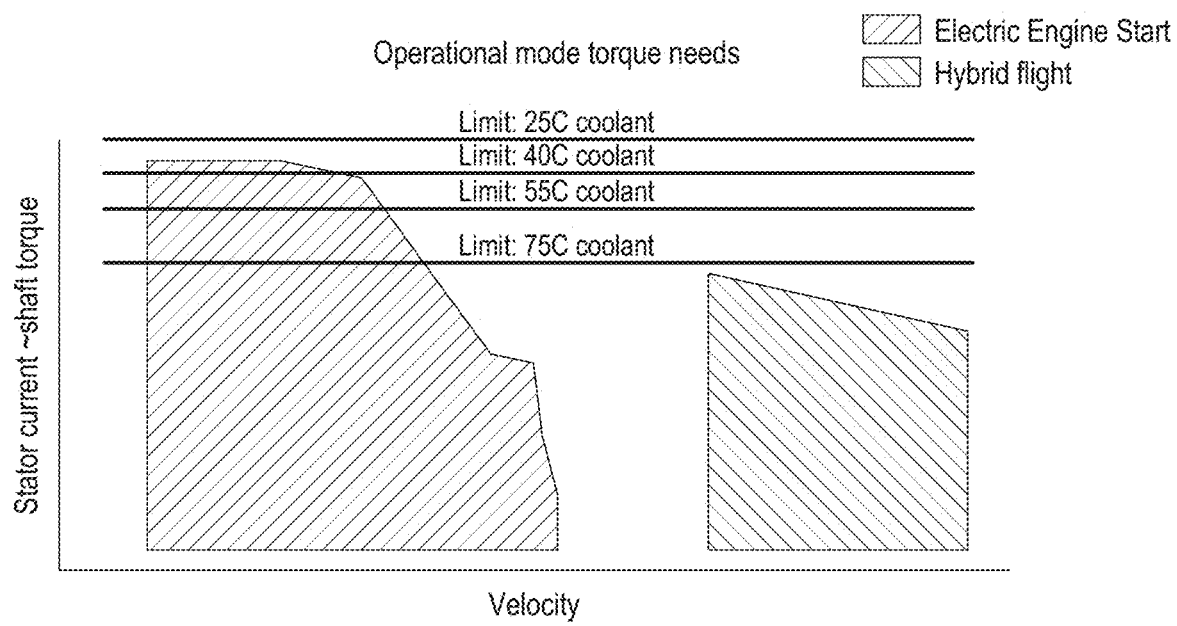
FIG. 4 shows typical coolant needs across different propulsion speeds.

FIG. 4 illustrates, on the chart of FIG. 2, coolant limits. If, however, the junction temperature problem is to be solved to lower coolant temperature (e.g. the 25 deg. C. shown in FIG. 4), an active coolant system would be required to reduce the fluid temperature to the required levels. This solution then just means that the problem of increased size and mass is shifted to the coolant domain, and so the aircraft is not optimised.

An alternative approach to the problem may be from a loss point-of-view. Power electronics losses result from conduction losses and switching losses. Conduction losses can only be reduced by reducing peak current or equivalent resistance. The higher current is needed to meet the torque operating point and the equivalent resistance is based on the coolant and/or the number of switches, however, and so both reductions are difficult to achieve without adversely impacting the system operation.

Switching losses have a temperature-dependent characteristic and are affected by switching frequency, but neither of these can be easily and effectively changed without impacting system operation. The DC voltage, however, also impacts switching losses and the system of the present disclosure takes advantage of this option for reducing switching losses by varying the DC voltage. By manipulating the voltage, to reduce switching losses, the system is able to tolerate greater conduction losses.

The solution provided by this disclosure is to use, as a power source for the electric drive system, a split battery stack, i.e. by providing one or more tap points at the intermediate nodes of a series stacked battery pack to provide lower supply voltages to the remaining parts of the electric drive system according to the propulsion system needs. This can work because, as seen in e.g. FIGS. 2 to 4, the key modes of the propulsion system are spaced and mutually exclusive. There is no need for rapid changes between the on-ground and flight modes.

Figure 5:
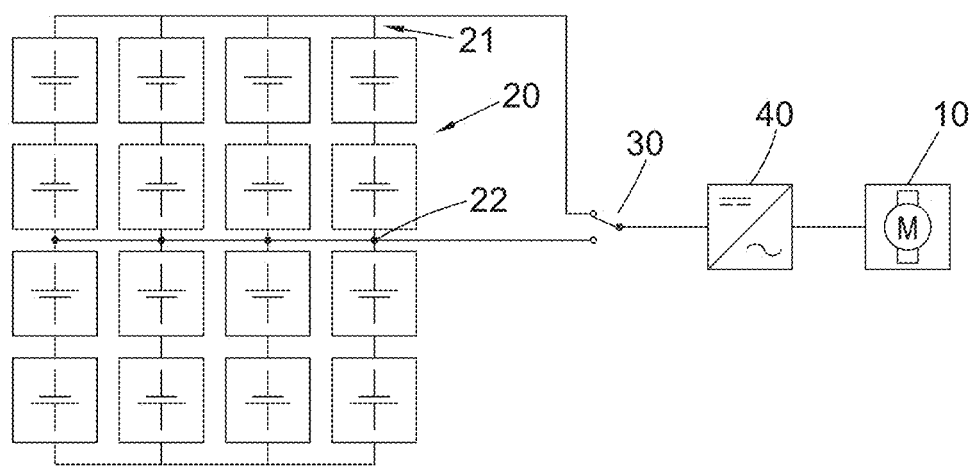
FIG. 5 shows an example of an electric drive system according to the disclosure.

FIG. 5 shows an example of an electric drive system according to this disclosure.

The system comprises an electric motor 10 that, in use, rotates to drive a propulsion device (here propeller). Power is provided to the motor from a battery stack 20 via a switch 30 and a power inverter 40.

In the example shown, the battery pack is represented as four layers and the full battery voltage is provided at the terminal end 21. A tap point is taken from the intermediate nodes 22 between, in this example, the middle two layers of the stack. This is just one example and tap points could, in fact, be taken from other nodes in addition or instead, and/or the battery stack could have a different configuration.

The battery stack 20 is connected to the inverter 40 via a switch 30. In this case, the switch is a single pole double throw (SPDT) contactor, which is a commonly available, simple mechanical switch. The switch is connected to switch between a first state, connecting with the terminal end 21 to provide an electrical connection between the full DC battery voltage and the motor, via the inverter, and a second state, connecting with the intermediate nodes 22 to provide an electrical connection between the lower (here 50%) battery voltage and the motor, via the inverter. The switch is controlled by a controller or battery management system (not shown here).

By providing a reduced voltage supply routed to the power converter/inverter 40, the switching loss contribution is reduced. This leads to reduced overall losses and/or allows increased conduction loss and so increased current conversion capability without an overall increase in loss.

Figure 6:
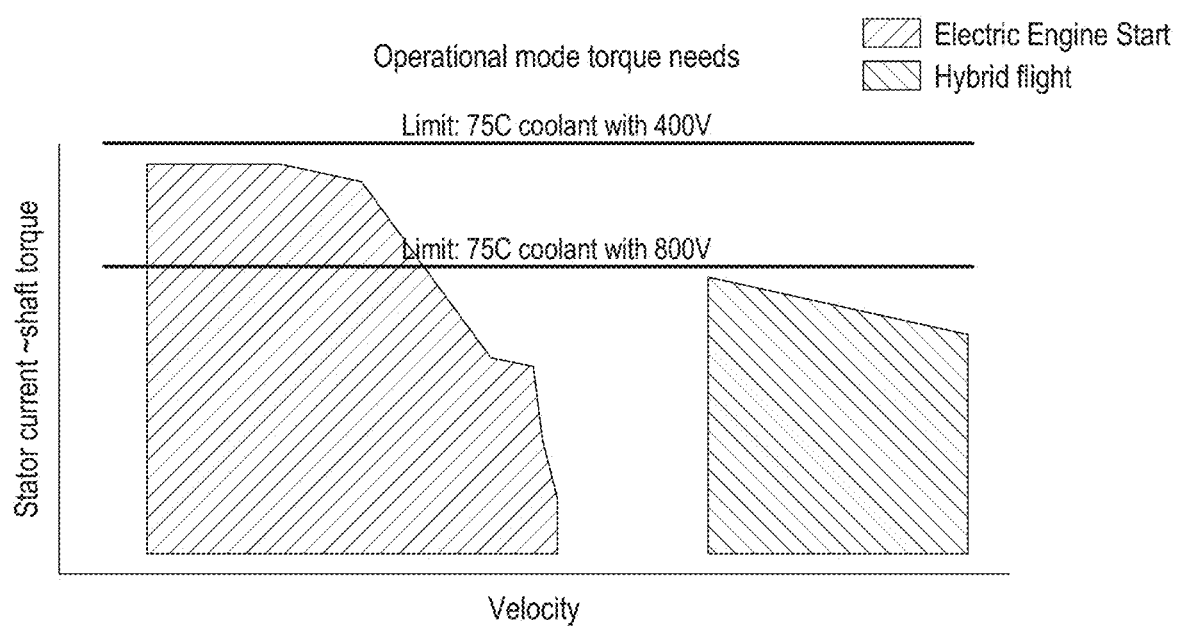
FIG. 6 illustrate coolant needs across different propulsion speeds for a system modified according to this disclosure.

As can be seen in FIG. 6, the reduced operating voltage provided by the split battery stack, allows for an improved resultant capability with lower coolant requirement—i.e. the system is able to operate reliably and efficiently even with higher coolant temperatures e.g. 75 deg. C. The lower coolant line in FIG. 6 shows the coolant capability at a higher (here 800 V) voltage, with coolant at 75 deg. C. The upper line shows the coolant capability at a lower (here 400 V) voltage, also with coolant at 75 deg. C. This means that with the lower voltage, a higher coolant temperature allows for full operation of the system and there is no need to lower the coolant temperature.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An electric motor drive system for a propulsion device, the system comprising:
   a battery stack having an earth terminal and an end terminal, the battery stack including series stacked cells between the earth terminal and the end terminal;
   an electric motor electrically connected to be powered by the battery stack, the motor configured to, in use, be connected to drive the propulsion device;
   a power converter electrically connected between the battery stack and the electric motor, and
   a switch between the power converter and the battery stack, the switch arranged to switch between a first state electrically connecting the end terminal of the battery stack to the power converter to provide a maximum battery voltage to the power converter, and a second state electrically connecting a tap point from one or more intermediate nodes located between adjacent series stacked cells, intermediate the earth terminal and the end terminal, of the battery stack, to provide a voltage less than the maximum battery voltage to the power converter.

2. The system of claim 1, wherein the switch is a single pole double throw, SPDT, contactor.

3. The system of claim 1, wherein the power converter comprises an inverter.

4. The system of claim 3, wherein the inverter comprises a plurality of inverter switches.

5. The system of claim 1, wherein the battery stack comprises a plurality of stack layers, and wherein the tap point is in a middle of the plurality of layers.

6. The system of claim 1, comprising a plurality of tap points to provide a plurality of different voltages.

7. The system of claim 1, further comprising:
   a battery management module to control operation of the switch.

8. A propulsion system comprising:
   a propulsion device; and
   an electric motor drive system as claimed in claim 1 connected to drive the propulsion device.

9. A propulsion system as claimed in claim 8, wherein the propulsion system is a hybrid propulsion system and further includes:
   an internal combustion engine drive system.

10. The propulsion system of claim 9, wherein the internal combustion engine drive system and the electric motor drive system are connected to the propulsion device in series.

11. The propulsion system of claim 9, wherein the internal combustion engine drive system and the electric motor drive system are connected to the propulsion device in parallel.

12. The propulsion system of claim 9, wherein the propulsion device is an aircraft propeller.

13. The propulsion system of claim 9, wherein the switch is a single pole double throw, SPDT, contactor.

14. The propulsion system of claim 9, wherein the power converter comprises an inverter.

15. The propulsion system of claim 14, wherein the inverter comprises a plurality of inverter switches.

16. The propulsion system of claim 9, wherein the battery stack comprises a plurality of stack layers, and wherein the tap point is in a middle of the plurality of layers.

* * * * *